Dec. 26, 1950  D. K. McGEHEE  2,535,441
DELAYED ACTING POWER LIFT
Filed Aug. 23, 1946  2 Sheets-Sheet 1
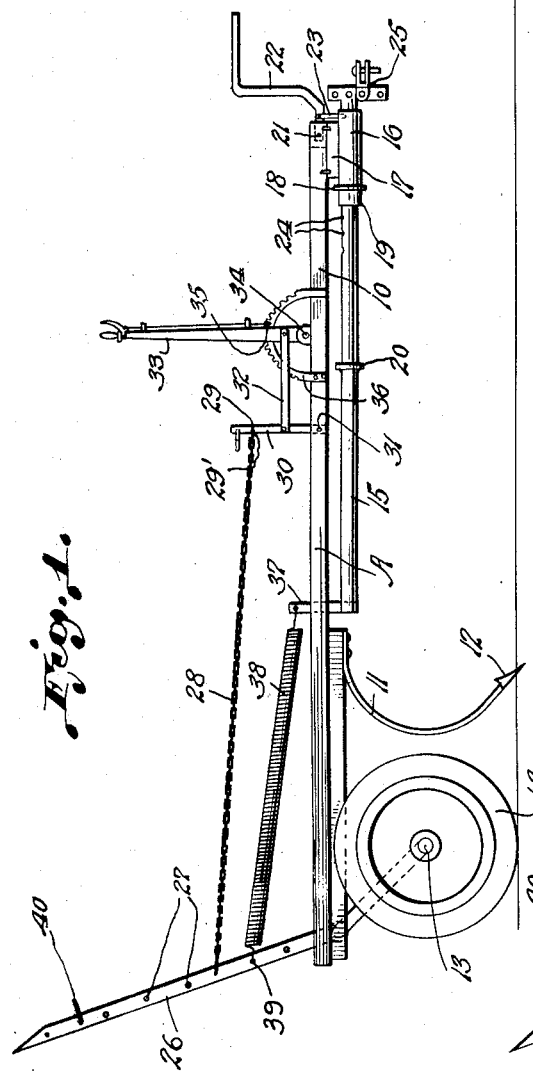
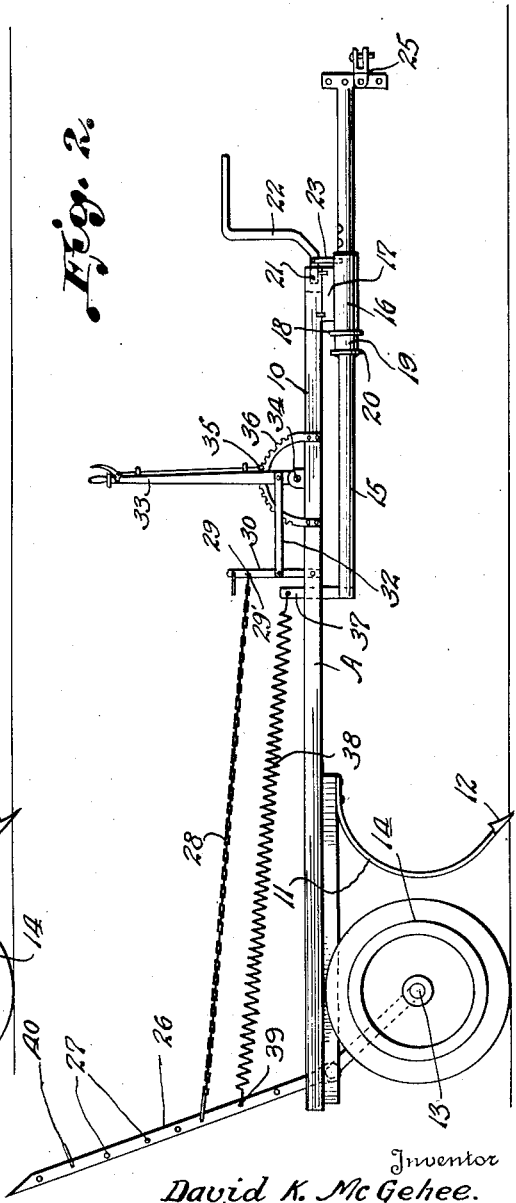
Inventor
David K. McGehee.
By [signature]
Attorney

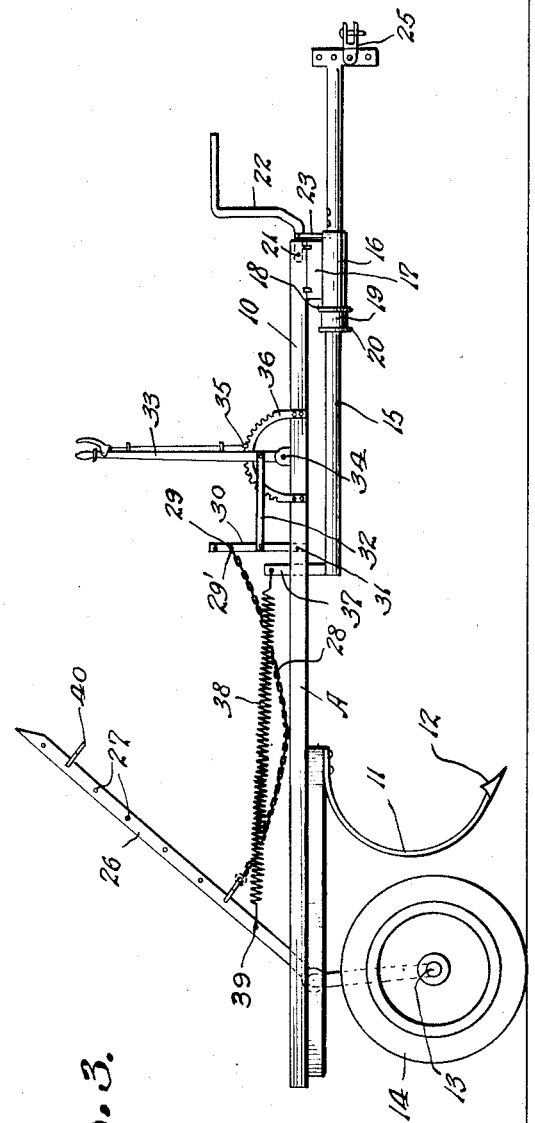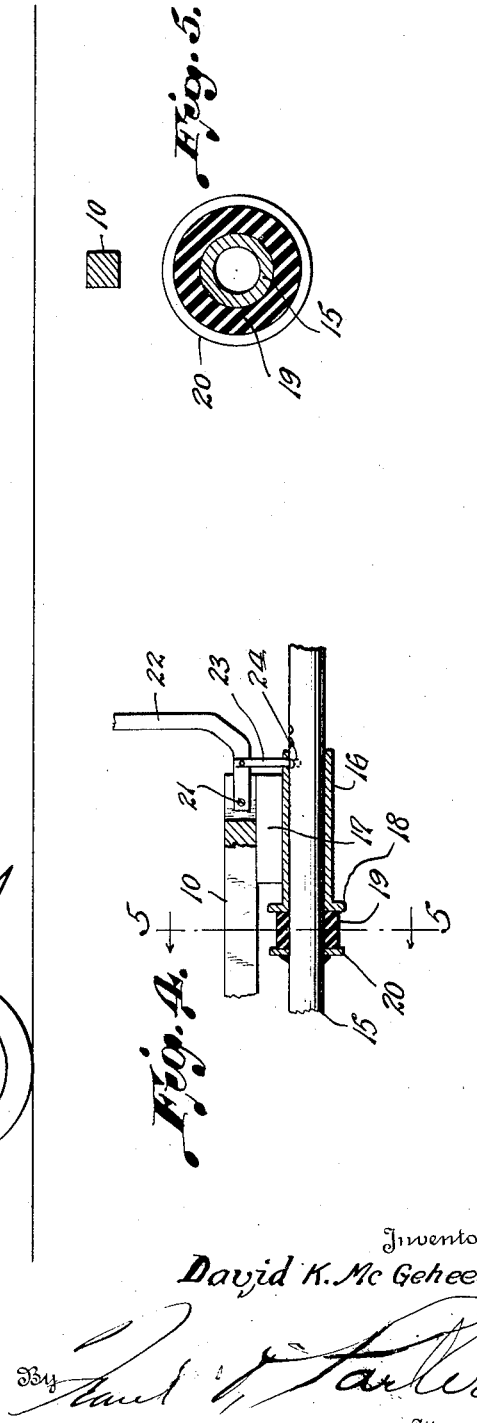

Patented Dec. 26, 1950

2,535,441

UNITED STATES PATENT OFFICE 2,535,441

DELAYED ACTING POWER LIFT

David K. McGehee, Canyon, Tex.

Application August 23, 1946, Serial No. 692,414

1 Claim. (Cl. 97—75)

The invention relates to a power lift generally, and more especially to a delayed acting power lift for ground working farm implements, such as plows, cultivators or the like hitched to a draft medium.

The primary object of the invention is the provision of a lift of this character, wherein through its connection with the tongue of a plow, cultivator or other ground working implement should the latter under pull thereof by a draft medium have its ground working element meet abnormal resistance, it, through delayed action, will be raised clear of the ground, the lift being of novel construction, and it is a refinement over the subject matter of Letters Patent No. 2,297,788, issued on or about October 6, 1942.

Another object of the invention is the provision of a lift of this character, wherein when the ground working element of an implement is out of the ground its weight through gravity will force it back again for ground working purposes, the lift being unique in assembly and arrangement in its connection with a farming implement.

A further object of the invention is the provision of a lift of this character, wherein the ground working implement can be regulated to assume a ground working position for either shallow or deep work, the lift also being under the control of an operator of the implement.

A still further object of the invention is the provision of a lift of this character, wherein it is adaptable for any and all types of ground working machinery, and it is possessed of few parts, thus economical in replacements and repairs.

A still further object of the invention is the provision of a lift of this character, which is simple in construction, thoroughly reliable and efficient in operation, strong, durable, readily and easily operated, automatic in the working thereof, easily applied and removed to and from an implement, and inexpensive to manufacture.

With these and other objects in view the invention consists in the features of construction, combination and arrangement of parts as will be hereinafter more fully described, illustrated in the accompanying drawings, these disclosing the preferred embodiment of the invention, and as pointed out in the claim hereunto appended.

In the accompanying drawings:

Figure 1 is a side elevation of a farming implement with the lift constructed in accordance with the invention applied thereto with the ground working element in normal working position.

Figure 2 is a view similar to Figure 1 showing the lift regulated for delayed lifting action.

Figure 3 is a view similar to Figure 2 showing the ground working element lifted by the delayed action.

Figure 4 is a fragmentary side elevation, partly in section or broken away, at the latching area of the lift.

Figure 5 is a sectional view taken on the line 5—5 of Figure 4 looking in the direction of the arrows.

Similar reference characters indicate corresponding parts throughout the several views in the drawings.

Referring to the drawings in detail, A designates generally a portion of a ground working implement, for example, a plow or cultivator, in this instance representative of a cultivator, having a tongue 10 which at its rear supports a share standard 11 carrying a ground working element 12, the tongue 10 being fitted with a cranked axle 13 on each end of which is journaled a ground wheel 14, the cranked axle 13 being turnable vertically, so that the implement A will be raised or lowered and correspondingly the element 12.

Beneath the fore portion of the tongue 10, parallel therewith, is a slidable draft bar 15 movably fitted in a sleeve-like guide bearing 16, which is fixed at 17, to the forward end of the tongue 10, the rear end of the said bearing 16 being formed with an outturned annular flange 18, against which is engaged a resilient cushioning collar 19, while fixedly held on the member or bar 15 is an annular abutment or stop ring 20 for contact with the collar 19 when the bar 15 has advanced relative to the tongue 10.

The tongue 10 at the forward end has connected thereto by a pivot 21 a hand released latch 22 which is adapted for vertical swinging movements and a keeper 23 of this latch is designed for releasable engagement in selected latching notches 24 provided in the bar 15, so that the latter can be latched in determined positions with relation to the said tongue 10, as will best appear in Figure 4 of the drawings.

At the fore end of the bar 15 is an adjustable hitch 25 for coupling with a draft medium, such as a tractor or the like, not shown, and this hitch may be of any selected type or construction.

Fixed to the crank portion of the axle 13 is an upstanding turning arm 26 which has adjustable connection therewith at selected points 27 a detachable chain 28, it being coupled at 29 at the forward end 29' to a swingable arm 30 which is connected by a pivot 31 to the tongue 10. This arm 30 through a link connection 32 with a throw lever 33, pivoted at 34, can be rocked for the swinging of the arm 26, the lever 33 being held in an adjusted position by a hand released latch 35 coacting with a keeper segment 36 rigid upon the said tongue 10.

The draft bar 15 at its rearmost end has an upstanding post 37 to which is connected a delayed acting lift spring 38 which at its rearmost end has a coupling at 39, selectively, with the arm 26, the spring in this instance being of the coiled retractile type.

The lift as a whole will work on most ground working implements and its ground engaging element by its own weight will remain engaged in the soil. Through the use of the spring 38 the said element remains in the ground until the draft medium has stretched sufficiently to lift the element 12 completely out of the ground.

The arm 26 at or near its uppermost end is provided with a hook 40 which is designed for the attachment of a suitable connection, not shown, adapting it for releasable engagement with the arm 30 so that the element 12 can be held in a raised position with respect to the ground and thus holding it out of working engagement therewith when desired.

The bar 15 can be latched in varying adjusted positions to regulate the delayed action of the lift.

The lever 33 with the chain 28 controls the element 12 for ground depth working thereof, the lever 33 being latched in a manner as before described.

In the normal operation of the implement with the ground working element 12 engaged in the soil, which is effected by having the draft bar 15 latched in a rearmost position to the tongue 10, thus releasing the tension on the lift spring 38, so that the arm 26 will have swung rearwardly of the implement A, thereby causing the tongue 10 to lower by the weight of the ground working element 12, bringing it into its ground working relation to the soil. Now, when the ground working element 12 meets an abnormal resistance in the soil the draft arm or bar 15 on release thereof during forward movement of the draft medium, such as a tractor or the like, causes the bar 15 to slide forward which tensions the lift spring 38. Thus the lever 26 is moved in a forward direction turning the cranked axle causing the ground working element 12 to become raised, lifting it out of the soil to relieve the abnormal resistance thereon and freeing the implement A therefrom.

What is claimed is:

A delayed acting power lift for a ground working machine having ground engaging wheels and a raising and lowering tool-carrying frame vertically shiftable relative to the wheels for bringing the machine into and out of ground working positions comprising: a movable arm connected to the frame and the wheels for vertically shifting said frame, a displaceable draw bar forwardly of the arm, guide means on the frame for supporting the bar, hand controlled means for adjusting the arm to regulate the ground working position of the frame, an expansible and retractible tensioning element adjustably connected to the arm and fixedly attached to the bar for tensioning the arm on the bar being displaced when the frame is in ground working position and resultant from abnormal resistance thereto for automatically effecting delayed vertical shifting action of the frame to bring the machine out of ground working position, cushioning means for coaction with the guide means and the draw bar, and a latch for the draw bar to hold it in displaced position for retracting the tensioning element.

DAVID K. McGEHEE.

REFERENCES CITED

The following references are of record in the file of this patent:

UNITED STATES PATENTS

| Number | Name | Date |
|---|---|---|
| 990,885 | Langlois | May 2, 1911 |
| 1,475,879 | Reynolds | Nov. 27, 1923 |
| 2,297,788 | McGehee | Oct. 6, 1942 |
| 2,332,739 | Mott | Oct. 26, 1943 |